US010754170B2

(12) United States Patent
Kim et al.

(10) Patent No.: US 10,754,170 B2
(45) Date of Patent: *Aug. 25, 2020

(54) ACTUATOR AND DRIVING APPARATUS OF CAMERA MODULE

(71) Applicant: SAMSUNG ELECTRO-MECHANICS CO., LTD., Suwon-si (KR)

(72) Inventors: Kyung Rin Kim, Suwon-si (KR); Jin Yong Kang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 80 days.

This patent is subject to a terminal disclaimer.

(21) Appl. No.: 15/655,130

(22) Filed: Jul. 20, 2017

(65) Prior Publication Data

US 2018/0149881 A1    May 31, 2018

(30) Foreign Application Priority Data

Nov. 28, 2016 (KR) .................. 10-2016-0159482

(51) Int. Cl.
| | |
|---|---|
| G02B 27/64 | (2006.01) |
| G02B 7/09 | (2006.01) |
| G03B 13/36 | (2006.01) |
| G03B 5/02 | (2006.01) |
| H02K 41/035 | (2006.01) |
| G02B 7/08 | (2006.01) |
| G03B 3/10 | (2006.01) |

(52) U.S. Cl.
CPC ............ *G02B 27/646* (2013.01); *G02B 7/08* (2013.01); *G02B 7/09* (2013.01); *G03B 5/02* (2013.01);

(Continued)

(58) Field of Classification Search
CPC ...... G02B 27/64; G02B 27/646; G02B 27/46; G02B 7/02; G02B 7/04; G02B 7/08;
(Continued)

(56) References Cited

U.S. PATENT DOCUMENTS

| | | | |
|---|---|---|---|
| 5,572,099 A | 11/1996 | Carobolante | |
| 5,809,346 A * | 9/1998 | Fujisaki | ............... G02B 27/646 396/55 |

(Continued)

FOREIGN PATENT DOCUMENTS

| | | |
|---|---|---|
| CN | 203025465 U | 6/2013 |
| CN | 105785690 A | 7/2016 |

(Continued)

OTHER PUBLICATIONS

Chinese Office Action dated Oct. 9, 2019 in corresponding Chinese Patent Application No. 201711213502.2 (11 pages in English, 9 pages in Chinese).

(Continued)

*Primary Examiner* — Jie Lei
(74) *Attorney, Agent, or Firm* — NSIP Law (57) ABSTRACT

An actuator of a camera module includes a magnetic body disposed on one side surface of a lens barrel, a driving coil, and a driving apparatus. The driving coil faces the magnetic body. The driving apparatus is configured to drive the driving coil in one of a linear driving scheme and a pulse width modulation (PWM) driving scheme based on an external illumination information in an illumination signal and move the lens barrel in a direction perpendicular to an optical axis direction.

13 Claims, 3 Drawing Sheets

(52) U.S. Cl.
CPC ......... *G03B 13/36* (2013.01); *H02K 41/0356* (2013.01); *G03B 3/10* (2013.01); *G03B 2205/0007* (2013.01); *G03B 2205/0069* (2013.01)

(58) Field of Classification Search
CPC .......... G02B 7/09; G02B 7/102; G03B 13/36; G03B 17/00; G03B 5/02; G03B 5/00; G03B 15/05; G03B 3/10; G03B 2205/0069; G03B 2205/0007; H04N 5/23287; H02K 41/035; H02K 41/0356
USPC ............... 359/554, 557, 813, 814, 819, 824; 396/55, 61, 63; 348/208.11, 353, 357
See application file for complete search history.

(56) References Cited

U.S. PATENT DOCUMENTS

| | | | |
|---|---|---|---|
| 6,272,289 B1 * | 8/2001 | Washisu | G03B 7/00 396/55 |
| 10,356,324 B2 * | 7/2019 | Kim | H04N 5/232 359/554 |
| 2009/0003813 A1 * | 1/2009 | Ohishi | H04N 5/23248 396/55 |
| 2011/0234887 A1 | 9/2011 | Shimohata et al. | |
| 2014/0211078 A1 | 7/2014 | Watanabe | |
| 2016/0109681 A1 | 4/2016 | Lam | |

FOREIGN PATENT DOCUMENTS

| | | |
|---|---|---|
| JP | 4877975 B2 | 2/2012 |
| JP | 5674618 B2 | 2/2015 |
| KR | 10-2013-0077216 A | 7/2013 |

OTHER PUBLICATIONS

Chinese Office Action dated Jan. 2, 2020 in counterpart Chinese Patent Application No. 201710817076.7 (13 pages in English and 7 pages in Chinese).

\* cited by examiner

ACTUATOR AND DRIVING APPARATUS OF CAMERA MODULE

CROSS-REFERENCE TO RELATED APPLICATION(S)

This application claims benefit under 35 USC 119(a) of priority to Korean Patent Application No. 10-2016-0159482 filed on Nov. 28, 2016 in the Korean Intellectual Property Office, the disclosure of which is incorporated herein by reference in its entirety.

BACKGROUND

1. Field

The following description relates to an actuator and a driving apparatus of a camera module.

2. Description of Related Art

A portable communications terminal, such as a cellular phone, a personal digital assistant (PDA), a portable personal computer (PC), or the like, is normally used to transmit video data and text or audio data. In accordance with such a trend, a camera module has recently been standardly installed in such a portable communications terminal in order to enable the transmission of video data, to enable video chatting, and other transmission of visual data.

Generally, a camera module includes a lens barrel having lenses disposed therein, a housing accommodating the lens barrel therein, and an image sensor converting an image of a subject into an electrical signal. A single focus type camera module imaging a subject with fixed focus may be used as the camera module. However, in view of recent developments in camera technology, a camera module including an actuator enabling auto-focusing has been used. In addition, such a camera module normally includes an actuator to perform an optical image stabilization (OIS) function in order to suppress a resolution decrease phenomenon due to hand-shake. The OIS function reduces a shutter speed in order to allow the image sensor to capture a larger amount of light at the time of imaging the subject in a low illumination environment as well as suppress an influence of hand-shake at the moment of pressing a shutter on an image. Therefore, the OIS function may also be applied to a case in which a captured image is blurry.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An embodiment describes an actuator and a driving apparatus of a camera module to prevent noise from being introduced into an image signal during execution of optical image stabilization (OIS) in a low illumination environment.

In accordance with an embodiment, there is provided an actuator of a camera module, including: a magnetic body disposed on one side surface of a lens barrel; a driving coil facing the magnetic body; and a driving apparatus configured to drive the driving coil in one of a linear driving scheme and a pulse width modulation (PWM) driving scheme based on an external illumination information in an illumination signal and move the lens barrel in a direction perpendicular to an optical axis direction.

The driving apparatus may be further configured to drive the driving coil in the PWM driving scheme in response to a level of external illumination being higher than a level of reference illumination.

The driving apparatus may be further configured to drive the driving coil in the linear driving scheme in response to a level of external illumination being lower than the level of reference illumination.

The driving apparatus may be further configured to apply a driving signal including a direct current (DC) signal form to the driving coil in the linear driving scheme.

The driving apparatus may be further configured to apply a driving signal including a PWM signal form to the driving coil in the PWM driving scheme.

The driving apparatus may be further configured to move the lens barrel in the direction perpendicular to the optical axis direction to perform optical image stabilization (OIS).

An image processor may be configured to perform image processing on an image signal input by an image sensor to provide the illumination signal.

An image processor may be configured to provide the illumination signal.

The driving apparatus may include a driving circuit connected to the driving coil and configured to apply the driving signal to the driving coil, and generate a control signal to the driving circuit.

The driving apparatus may be further configured to generate the control signal having a direct current (DC) signal form in the linear driving scheme, and generate the control signal having a PWM signal form in the PWM driving scheme.

The driving apparatus may be further configured to compare a level of a control signal in a previous scheme with a level of a control signal in a subsequent scheme in response to a driving scheme of the driving coil being changed by the external illumination information.

The driving apparatus may be further configured to maintain the previous scheme in response to a deviation between the level of the control signal in the previous scheme and the level of the control signal in the subsequent scheme being outside of a reference deviation range.

The driving apparatus may be further configured to change the driving scheme to the subsequent scheme in response to the deviation between the level of the control signal in the previous scheme and the level of the control signal in the subsequent scheme being within the reference deviation range.

In accordance with an embodiment, there is provided a driving apparatus of a camera module, including: a comparator comparing a present position with a target position of a lens barrel to calculate an error value; a driving scheme determining processor configured to determine a driving scheme of a driving coil based on external illumination information; a controller configured to generate a control signal based on a level determined depending on the error value and a form determined based on the driving scheme; and a driver circuit configured to provide a driving signal to the driving coil based on the control signal.

The driving scheme determining processor may be further configured to determine that the driving scheme of the driving coil may be a pulse width modulation (PWM) driving scheme in response to a level of external illumination being higher than a level of reference illumination.

The driving scheme determining processor may be further configured to determine that the driving scheme of the driving coil may be a linear driving scheme in response to the level of external illumination being lower than the level of reference illumination.

The controller may be further configured to generate the control signal having a direct current (DC) signal form in the linear driving scheme.

The controller may be further configure to generate the control signal having a PWM signal form in the PWM driving scheme.

The driving scheme determining processor may be further configured to compare a level of a control signal in a previous scheme with a level of a control signal in a subsequent scheme in response to the driving scheme of the driving coil being changed by the external illumination information.

The driving scheme determining processor may be further configured to maintain the previous scheme in response to a deviation between the level of the control signal in the previous scheme and the level of the control signal in the subsequent scheme being outside of a reference deviation range, and changes the driving scheme to the subsequent scheme in response to the deviation between the level of the control signal in the previous scheme and the level of the control signal in the subsequent scheme being within the reference deviation range.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Figure 1:
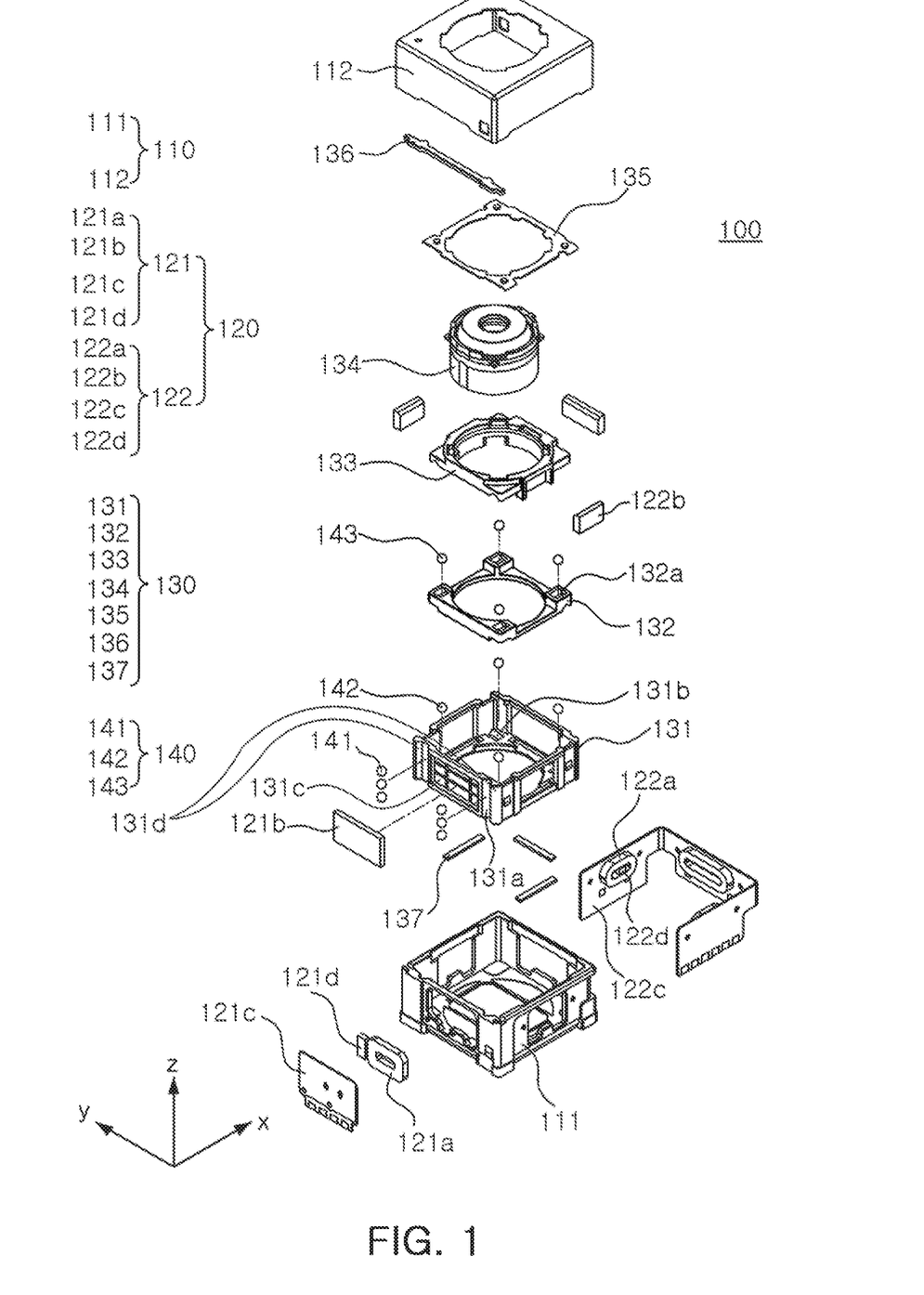
FIG. 1 is an exploded perspective view illustrating a camera module, according to an embodiment.

FIG. 1 is an exploded perspective view illustrating a camera module, according to an embodiment.

Referring to FIG. 1, a camera module 100, according to an embodiment, includes a housing unit 110, an actuator 120, and a lens module 130.

The housing unit 110 includes a housing 111 and a shield case 112.

The housing 111 is formed of a material that is easily molded. For example, the housing 111 may be formed of plastic or a polyurethane material. At least one actuator 120 is mounted in the housing 111. As an example, portions of a first actuator 121 are mounted on a first side of the housing 111, and portions of a second actuator 122 are mounted on second to fourth sides of the housing 111. The housing 111 is configured to accommodate the lens module 130 therein. As an example, a space in which the lens module 130 is completely or partially accommodated is formed in the housing 111.

In addition, six sides of the housing 111 are open, each side having a frame defining a cavity, perforation, or hole. As an example, a rectangular hole for an image sensor is formed in a bottom surface of the housing 111, and a rectangular hole to mount the lens module 130 described above is formed in a top surface of the housing 111. In addition, the first side of the housing 111 is open so that a first driving coil 121a of the first actuator 121 is inserted thereinto, and the second to fourth sides of the housing 111 are open so that second driving coils 122a of the second actuator 122 are inserted thereinto.

The shield case 112 is configured to cover portions of the housing 111. As an example, the shield case 112 is configured to cover the top surface and four sides of the housing 111. Alternatively, the shield case 112 is configured to cover only the four sides of the housing 111 or is configured to partially cover the top surface and the four sides of the housing 111. The shield case 112 blocks electromagnetic waves generated during driving of the camera module. That is, the electromagnetic waves are generated at the time that the camera module is driven. In response to the electromagnetic waves being emitted externally to the camera module, the electromagnetic waves affect other electronic components, causing communications error problems and/or malfunctions therein. In order to prevent such a problem, the shield case 112 is formed of a metal and is grounded to a ground pad of a substrate mounted on the bottom surface of the housing 111 to block the electromagnetic waves. Further, when the shield case 112 is formed of a plastic injection-molded product, a conductive paint is applied to an inner surface of the shield case 112 or a conductive film or a conductive tape is attached to the inner surface of the shield case 112 to block the electromagnetic waves. In this example, the conductive paint is conductive epoxy, but is not limited thereto. That is, various materials having conductivity may be used as the conductive paint.

The number of actuators 120 may be more than one actuator. As an example, the actuators 120 includes the first actuator 121 configured to move the lens module 130 in a Z-axis direction and the second actuator 122 configured to move the lens module 130 in an X-axis direction and a Y-axis direction.

The first actuator 121 is mounted on the housing 111 and a first frame 131 of the lens module 130. As an example, portions of the first actuator 121 are mounted on the first side of the housing 111, and the other portions of the first actuator 121 are mounted on a first side of the first frame 131. The first actuator 121 includes mechanical and electrical components to move the lens module 130 in an optical axis direction, that is, the Z-axis direction. As an example, the first actuator 121 includes the first driving coil 121*a*, a first magnetic body 121*b*, a first substrate 121*c*, and a first position detector 121*d*. The first driving coil 121*a* and the first position detector 121*d* are formed on the first substrate 121*c*. The first substrate 121*c* is mounted on the first side of the housing 111, and the first magnetic body 121*b* may be mounted on the first side of the first frame 131 facing the first substrate 121*c*.

A first driving apparatus (not illustrated) providing a driving signal to the first driving coil 121*a* may be provided on the first substrate 121*c*. The first driving apparatus applies the driving signal to the first driving coil 121*a* to provide driving force to the first magnetic body 121*b*. The first driving apparatus includes a driver integrated circuit (IC) providing or outputting the driving signal to the first driving coil 121*a*. In one example, in response to the driving signal being output from the first driving apparatus to the first driving coil 121*a*, a magnetic flux is generated in the first driving coil 121*a*, and interacts with a magnetic field of the first magnetic body 121*b* to generate a driving force to enable relative movement of the first frame 131 and a lens barrel 134 with respect to the housing 111 based on Fleming's left hand rule. The first driving apparatus includes an H-bridge circuit that is bidirectionally driven to apply the driving signal to the first driving coil 121*a* in a voice coil motor scheme.

The first actuator 121 senses a strength of the magnetic field from the first magnetic body 121*b* using the first position detector 121*d* to detect positions of the first frame 131 and the lens barrel 134. As an example, the first position detector 121*d* includes a hall sensor. In one configuration, the hall sensor is positioned within the first driving coil 121*a* or adjacent to the first driving coil 121*a*. The first magnetic body 121*b* is disposed on one side 131*c* of the first frame 131, as illustrated, or is disposed on one of corners 131*d* of the first frame 131.

The second actuator 122 is mounted on the housing 111 and a third frame 133 of the lens module 130. As an example, portions of the second actuator 122 are mounted on the second to fourth sides of the housing 111, and the other portions of the second actuator 122 are mounted on second to fourth sides of the third frame 133. Further, the second actuator 122 is mounted in one or more of the first to fourth sides of the housing 111 and the third frame 133, or is mounted on second to fourth corners, at which the second to fourth sides are in contact with each other. The second actuator 122 includes components to move the lens module 130 in a direction perpendicular to the optical axis direction. As an example, the second actuator 122 includes one or more second driving coils 122*a*, one or more second magnetic bodies 122*b*, a second substrate 122*c*, and one or more second position detectors 122*d*. The second driving coils 122*a* and the second position detectors 122*d* are formed on the second substrate 122*c*. The second substrate 122*c* has a generally rectangular shape of which one side is open, perforated, or with a hole or cavity, and is mounted to surround the second to fourth sides of the housing 111. The second magnetic bodies 122*b* are mounted on the second to fourth sides of the third frame 133, respectively, to face the second substrate 122*c*.

A second driving apparatus (not illustrated) provides driving signals to the second driving coils 122*a* and is positioned on the second substrate 122*c*. The second driving apparatus applies the driving signals to the second driving coils 122*a* to provide or output a driving force to the second magnetic bodies 122*b*. The second driving apparatus includes a driver integrated circuit (IC) providing the driving signals to the second driving coils 122*a*. In an example, in response to the second driving apparatus producing, providing, or outputting the driving signals to the second driving coils 122*a*, magnetic flux is generated in the second driving coils 122*a*, which interacts with magnetic fields of the second magnetic bodies 122*b*. The second driving apparatus changes a magnitude and a direction of a magnetic force generated between the second driving coils 122*a* and the second magnetic bodies 122*b* to enable relative movement of a second frame 132 or the third frame 133 with respect to the first frame 131. The second driving apparatus includes an H-bridge circuit that is bidirectionally driven to apply the driving signals to the second driving coils 122*a* in a voice coil motor scheme.

The lens barrel 134 is moved along the optical axis direction along a movement of the second frame 132 or the third frame 133. The second actuator 122 configured as described above senses strength of the magnetic fields of the second magnetic bodies 122*b* through the second position detectors 122*d* to detect positions of the lens barrel 134 and the second and third frames 132 and 133.

The lens module 130 is mounted in the housing unit 110. As an example, the lens module 130 is accommodated in an accommodation space formed by the housing 111 and the shield case 112 to be movable in at least three axis directions. The lens module 130 includes a plurality of frames. As an example, the lens module 130 includes the first frame 131, the second frame 132, and the third frame 133.

The first frame 131 is configured to be movable with respect to the housing 111. As an example, the first frame 131 moves in the optical axis direction (the Z-axis direction) of the housing 111 by the first actuator 121 described above. A plurality of guide grooves 131*a* and 131*b* are formed in the first frame 131. As an example, a first guide groove 131*a* extended to be elongated in the optical axis direction (the Z-axis direction) is formed on the first side of the first frame 131, and second guide grooves 131*b* extended to be elongated in a first direction (the Y-axis direction) perpendicular to the optical axis direction are formed in four corners of an inner bottom surface of the first frame 131, respectively. The first frame 131 may be manufactured so that at least three sides thereof are open. As an example, second to fourth sides of the first frame 131 open so that the second magnetic bodies 122*b* of the third frame 133 and the second driving coils 122*a* of the housing 111 face each other.

The second frame 132 is mounted on the first frame 131. As an example, the second frame 132 is mounted in an internal space of the first frame 131. The second frame 132 is configured to move in the first direction (the Y-axis direction) perpendicular to the optical axis direction with respect to the first frame 131. As an example, the second frame 132 moves in the first direction (the Y-axis direction) perpendicular to the optical axis direction along the second guide grooves 131b of the first frame 131. A plurality of guide grooves 132a are formed in the second frame 132. As an example, four third guide grooves 132a extended to be elongated in a second direction (the X-axis direction) perpendicular to the optical axis direction may be formed in corners of the second frame 132, respectively.

In one configuration, the first guide groove 131a is formed to have a different shape than the second guide grooves 131b. In one example, the first guide groove 131a has a U-shape groove, where the second guide grooves 131b have V-shaped or squared shaped grooves. In the alternative, the first guide groove 131a has a V-shape or square shape groove, where the second guide grooves 131b have U-shaped grooves. In an example, the first guide groove 131a and the second guide grooves 131b have the same groove shape. In another example, the second guide grooves 131b have the same groove shape. In a further example, the second guide grooves 131b have different groove shapes, such as U-shape, V-shape, or square shape.

The third frame 133 is mounted on the second frame 132. As an example, the third frame 133 is mounted on a top surface of the second frame 132. The third frame 133 is configured to move in the second direction (the X-axis direction) perpendicular to the optical axis direction with respect to the second frame 132. As an example, the third frame 133 moves in the second direction (the X-axis direction) perpendicular to the optical axis direction along the third guide grooves 132a of the second frame 132. The second magnetic bodies 122b are mounted on the third frame 133. As an example, at least two second magnetic bodies 122b is mounted on the second to fourth sides of the third frame 133, respectively. Alternatively, as an example, three second magnetic bodies 122b is mounted on the second to fourth sides of the third frame 133, respectively. Meanwhile, the third frame 133 described above may be formed integrally with the second frame 132. In this case, the third frame 133 may be omitted, and the second frame 132 may move in the first direction (the Y-axis direction) and the second direction (the X-axis direction) perpendicular to the optical axis direction.

The lens module 130 includes the lens barrel 134. As an example, the lens module 130 includes the lens barrel 134 including one or more lenses. The lens barrel 134 has a hollow cylindrical shape so that at least one lens imaging a subject is accommodated therein. The lens is positioned within the lens barrel 134 along an optical axis. The number of lenses stacked in the lens barrel 134 may depend on a design of the lens barrel 134, and these lenses may have optical characteristics such as the same refractive index or different refractive indices, or the like.

The lens barrel 134 is mounted in the third frame 133. As an example, the lens barrel 134 is inserted into the third frame 133 to thereby move integrally with the third frame 133. The lens barrel 134 is configured to move in the optical axis direction (the Z-axis direction) and directions (the X-axis and Y-axis directions) perpendicular to the optical axis direction. As an example, the lens barrel 134 moves in the optical axis direction (the Z-axis direction) by the first actuator 121, and moves in the directions (the X-axis and Y-axis directions) perpendicular to the optical axis direction by the second actuator 122.

As described above, the first actuator 121 is operated in order to perform an auto-focusing (AF) function of the camera module 100, and the second actuator 122 is operated in order to perform optical image stabilization (OIS) of the camera module 100.

Furthermore, the lens module 130 includes a cover member 135, a ball stopper 136, and magnetic bodies 137. The cover member 135 is configured to prevent separation of the second frame 132 and the third frame 133 from the internal space of the first frame 131. As an example, the cover member 135 is coupled to the first frame 131 to block the second frame 132 and the third frame 133 from escaping upwardly from the first frame 131. In other words, a first movement of the second frame 132 and the third frame 133 in the optical axis direction is limited by the cover member 135. A second movement of the second frame 132 and the third frame 133 in the direction perpendicular to the optical axis is guided by the cover member 135.

The ball stopper 136 is mounted on the first frame 131. As an example, the ball stopper 136 is disposed to cover the first guide groove 131a of the first frame 131 to block separation of first ball bearings 141 mounted in the first guide groove 131a.

The magnetic bodies 137 are mounted on the first frame 131. As an example, the magnetic bodies 137 are mounted on one or more of the second to fourth sides of the first frame 131 to generate attractive force with the second driving coils 122a and the second magnetic bodies 122b of the second actuator 122. The magnetic bodies 137 configured as described above secure of fix positions of the second frame 132 and the third frame 133 with respect to the first frame 131 in an inactive state of the actuator 120. As an example, the lens module 130 is maintained in a predetermined position within the housing 111 by attractive force between the magnetic bodies 137 and the second driving coils 122a.

A ball bearing part 140 is configured to move the lens module 130 smoothly. As an example, the ball bearing part 140 is configured so that the lens module 130 moves smoothly in the optical axis direction and the direction perpendicular to the optical axis direction. The ball bearing part 140 includes the first ball bearings 141, second ball bearings 142, and third ball bearings 143 distinguished from each other depending on their positions. As an example, the first ball bearings 141 are disposed in the first guide groove 131a of the first frame 131 to allow the first frame 131 to move smoothly in the optical axis direction. As another example, the second ball bearings 142 is disposed in the second guide grooves 131b of the first frame 131 to allow the second frame 132 to move smoothly in the first direction perpendicular to the optical axis direction. As another example, the third ball bearings 143 are disposed in the third guide grooves 132a of the second frame 132 to allow the third frame 133 to move smoothly in the second direction perpendicular to the optical axis direction.

As an example, each of the first and second ball bearings 141 and 142 include at least three balls, and at least three balls of each of the first and second ball bearings 141 and 142 are disposed in the first or second guide grooves 131a or 131b, respectively. Alternatively, each of the first and second ball bearings 141 and 142 include four balls, and the four balls of each of the first and second ball bearings 141 and 142 may be disposed in the first or second guide grooves 131a or 131b, respectively. A lubricating substance to reduce friction and noise may be filled in all the portions in which the ball bearing part 140 is disposed. As an example, a viscous fluid is injected into the respective guide grooves 131a, 131b, and 132a. As the viscous fluid, grease having excellent viscosity and lubricating characteristics is used.

Figure 2:
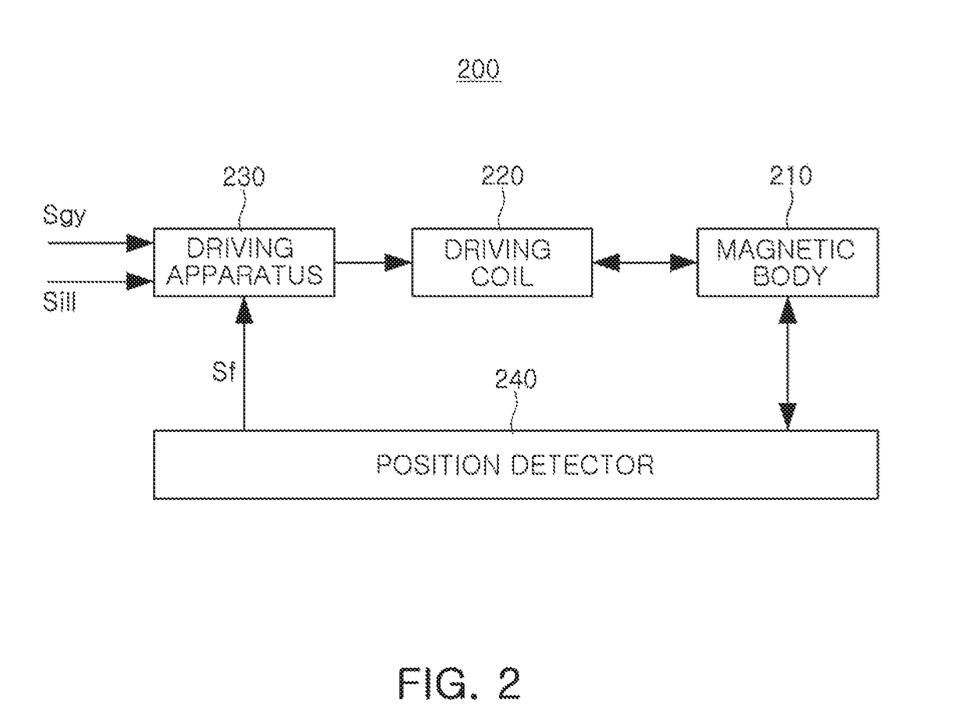
FIG. 2 is a block diagram illustrating an actuator used in a camera module, according to an embodiment.

FIG. 2 is a block diagram illustrating an actuator used in a camera module, according to an embodiment. An actuator 200, according to the embodiment illustrated in FIG. 2, which corresponds to the second actuator 122 of FIG. 1, performs an optical image stabilization function of the camera module.

The actuator 200 includes a magnetic body 210, a driving coil 220, a driving apparatus 230, and a position detector 240.

The driving apparatus 230 generates a driving signal Sdr depending on a gyro signal Sgy input from an external source and a feedback signal Sf generated from the position detector 240, and outputs or provides the generated driving signal Sdr to the driving coil 220. The gyro signal Sgy is produced by a gyro sensor used in the camera module or a mobile device. A target position of the lens barrel is determined by the gyro signal Sgy. The gyro signal Sgy is generated from shaking of the camera module 100 or the mobile device sensed by the gyro sensor, and additionally, is generated through an integrator extracting angle information from angular velocity information directly output from the gyro sensor and a high pass filter and a low pass filter removing direct current (DC) offset and high frequency noise.

When the driving signal Sdr is applied from the driving apparatus 230 to the driving coil 220, the lens barrel moves in the direction perpendicular to the optical axis direction by electromagnetic interaction between the driving coil 220 and the magnet body 210. The position detector 240 detects a present position of the magnetic body 210 moving by electromagnetic interaction between the magnetic body 210 and the driving coil 220 to generate the feedback signal Sf, and provide the feedback signal Sf to the driving apparatus 230.

When the feedback signal Sf is provided to the driving apparatus 230, the driving apparatus 230 compares the gyro signal Sgy and the feedback signal Sf with each other to once again generate the driving signal Sdr. That is, the driving apparatus 230 is driven in a close loop type of comparing the gyro signal Sgy and the feedback signal Sf with each other. The close loop type driving apparatus 230 is driven to reduce an error between a target position included in the gyro signal Sgy and the present position included in the feedback signal. The close loop type driving has linearity, accuracy, and repeatability improved compared to an open loop system type.

The driving apparatus 230 includes an H-bridge circuit that may be bidirectionally driven to apply the driving signal to the driving coil 220 in a voice coil motor scheme. The H-bridge circuit may include one or more switch elements, and each of one or more switch elements may be connected to the driving coil.

The driving apparatus 230 drives the driving coil 220 in one of a linear driving scheme and a pulse width modulation (PWM) driving scheme. The driving apparatus 230 applies control signals having a DC signal form to the switch elements of the H-bridge circuit at the time of driving the driving coil 220 in the linear driving scheme, and applies control signals having a PWM signal form to the switch elements of the H-bridge circuit at the time of driving the driving coil 220 in the PWM driving scheme.

When the driving apparatus 230 drives the driving coil 220 in the linear driving scheme, the driving apparatus 230 continuously applies the control signals having the DC signal form to the switch elements included in the H-bridge circuit. Therefore, an amount of current flowing in the H-bridge circuit is linearly adjusted, but power consumption may be increased.

Further, when the driving apparatus 230 drives the driving coil 220 in the PWM driving scheme, the driving apparatus 230 adjusts pulse widths of the control signals provided to the switch elements included in the H-bridge circuit and having the PWM signal form. Therefore, power consumption is relatively reduced, but noise may be introduced into an image signal obtained in an image sensor due to repeated switch on/off operations of the switch elements. At the time of driving the driving coil in the PWM driving scheme, an influence by noise is slight in a general illumination environment or a high illumination environment, but an image is distorted by the noise in a low illumination environment.

The driving apparatus 230 of the camera module 100, according to an embodiment, determines a driving scheme of the driving coil 220 based on external illumination information included in an illumination signal Sill at the time of performing optical image stabilization (OIS). As an example, the driving apparatus 230 determines that the driving coil 220 is driven in the PWM driving scheme when a level of external illumination information is higher than a level of reference illumination, and determines that the driving coil 220 is driven in the linear driving scheme when the level of external illumination information is lower than the level of reference illumination. In this example, the illumination signal Sill is provided by an image processor performing image processing on an image signal input by the image sensor. Alternatively, the illumination signal Sill is provided by an illumination sensor used in the camera module or the mobile device.

Figure 3:
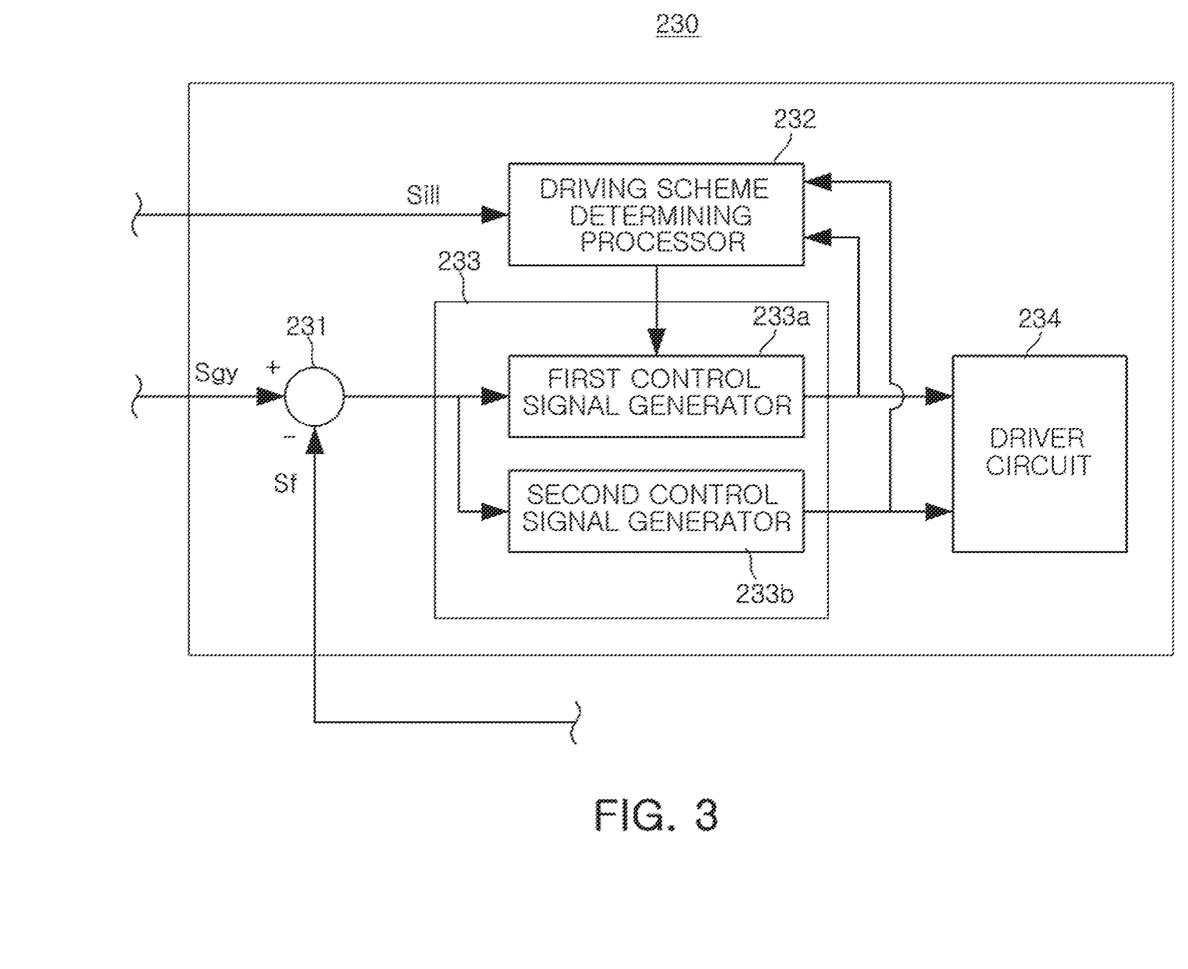
FIG. 3 is a block diagram illustrating a driving apparatus used in the actuator, according to an embodiment.

FIG. 3 is a block diagram illustrating a driving apparatus used in the actuator, according to an embodiment.

The driving apparatus 230 includes a comparator 231, a driving scheme determining processor 232, a controller 233, and a driver circuit 234.

The comparator 231 compares the gyro signal Sgy and the feedback signal Sf generated from the position detector 240 with each other. The comparator 231 compares the target position of the lens barrel included in the gyro signal Sgy with the present position of the lens barrel included in the feedback signal to calculate an error value. A movement distance and a movement direction of the lens barrel in the directions perpendicular to the optical axis direction are determined by the error value calculated in the comparator 231.

The driving scheme determining processor 232 determines a control scheme of the controller 233 from the illumination signal Sill. The driving scheme determining processor 232 compares the level of external illumination information of the illumination signal Sill with the level of reference illumination to determine a driving scheme of the driving coil 220. As an example, the driving scheme determining processor 232 determines that the driving coil 220 is driven in the PWM driving scheme in response to the level of external illumination information of the illumination signal Sill being higher than the level of reference illumination, and determines that the driving coil 220 is driven in the linear driving scheme in response to the level of external illumination information of the illumination signal Sill being lower than the level of reference illumination.

The controller 233 generates a control signal based on the error value from the comparator 231 and the driving scheme determined at the driving scheme determining processor 232.

The controller 233 includes a first control signal generator 233a and a second control signal generator 233b. The first control signal generator 233a and the second control signal generator 233b are selectively operated, based on the driving scheme determined in the driving scheme determining processor 232.

In response to the driving scheme determining processor 232 determining that the driving coil 220 is driven in the linear driving scheme, the first control signal generator 233a generates the control signals having the DC signal form. In response to the driving scheme determining processor 232 determining that the driving coil 220 is driven in the PWM driving scheme, the second control signal generator 233b generates the control signals having the PWM signal form.

Each of the first control signal generator 233a and the second control signal generator 233b includes a proportional integral derivative (PID) controller, where the control signals are generated in a PID scheme. The first control signal generator 233a and the second control signal generator 233b perform a control proportional to a magnitude of the error value in a present state based on a proportional control, perform a control for reducing an error in a steady state based on an integral control, and perform a control to prevent a rapid change to reduce overshoot based on a derivative control.

The control in the PID scheme is represented by Equation 1. In Equation 1, $K_P$ indicates a proportional control gain, $K_I$ indicates an integral control gain, and $K_D$ indicates a derivative control gain. The first control signal generator 233a and the second control signal generator 233b generate the control signals by applying each of the proportional control gain ($K_P$), the integral control gain ($K_I$), and the derivative control gain ($K_D$) to the error value corresponding to a difference between the target position of the lens barrel and the present position of the lens barrel at the time of performing the control in the PID scheme. Therefore, levels of the control signals are determined depending on the error value.

$$u(t) = K_P e(t) + K_I \int e(t)dt + K_D \frac{de(t)}{dt} \quad \text{[Equation 1]}$$

The driver circuit 234 may generate a driving signal depending on the control signal provided by the controller 233. The driving signal may be provided to both ends of the driving coil 220 in a form of a current and a voltage. The lens barrel may move to the target position by the driving signal generated in the driver circuit 234.

The driver circuit 234 may include an H-bridge circuit that may be bidirectionally driven to apply the driving signal to the driving coil 220 in a voice coil motor scheme. When the driver circuit 234 is driven in the voice coil motor scheme, the control signal provided by the controller 233 may be applied to a gate of a switch element included in the H-bridge.

The driver circuit 234 applies a driving signal having a DC signal form to the driving coil 220 in response to the control signal having the DC signal form being produced or provided by the first control signal generator 233a, and applies a driving signal having a PWM signal form to the driving coil 220 in response the control signal having the PWM signal form is produced or provided by the second control signal generator 233b.

The controller 233 may gradually raise a level of the control signal in order to reduce switching loss of the switching element of the H-bridge circuit and prevent an inrush current at the time of an initial operation to move the lens barrel to the target position. For example, the first control signal generator 233a gradually raises the control signal having the DC signal form at the time of an initial operation in the linear driving scheme, and the second control signal generator 233b gradually raises a duty ratio of the control signal having the PWM signal form at the time of an initial operation in the PWM driving scheme. That is, at the time of the initial operation, a specific time may be required for the level of the control signal to arrive at a specific level.

Therefore, in response to the driving scheme being changed due to a change in a level of external illumination, distortion may occur in an image signal due to discontinuity of the driving scheme. For instance, when the driving scheme is changed from the linear driving scheme to the PWM driving scheme, a level of the control signal in the PWM driving scheme does not arrive at a level of the control scheme in the linear driving scheme, such that the discontinuity may occur between the linear driving scheme and the PWM driving scheme. In addition, when the driving scheme is changed from the PWM driving scheme to the linear driving scheme, a level of the control signal in the linear driving scheme does not arrive at a level of the control scheme in the PWM driving scheme, such that the discontinuity may occur between the PWM driving scheme and the linear driving scheme.

The driving scheme determining processor 232, according to an embodiment, compares the level of the control signal in the previous driving scheme and the level of the control signal in the next driving scheme with each other when the driving scheme needs to be changed due to a change in the level of external illumination. In response to a deviation between the level of the control signal in the previous driving scheme and the level of the control signal in the next driving scheme being out of a reference deviation range as a comparison result, the previous driving scheme is maintained. Then, in response to the deviation between the levels of the two control signals being within the reference deviation range due to arrival of the level of the control signal in the next driving scheme at the level of the control signal in the previous driving scheme as a result of the maintenance of the previous driving scheme, the driving scheme changes to the next driving scheme.

As set forth above, according to the exemplary embodiment in the present disclosure, when optical image stabilization (OIS) is performed in a low illumination environment, introduction of noise into an image signal may be prevented.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An actuator of a camera module, comprising:
a magnetic body disposed on one side surface of a lens barrel;
a driving coil facing the magnetic body; and
a driving apparatus configured to drive the driving coil in a linear driving scheme in response to an external illumination information in an illumination signal being lower than a level of reference illumination and a pulse width modulation (PWM) driving scheme in response to the external illumination information in the illumination signal being higher than a level of reference illumination and move the lens barrel in a direction perpendicular to an optical axis direction,
wherein an image processor is configured to perform image processing on an image signal input by an image sensor to provide the illumination signal, and
wherein the driving apparatus comprises a driving scheme determining processor configured to maintain the previous scheme in response to a deviation between the level of the control signal in the previous scheme and the level of the control signal in the subsequent scheme being outside of a predetermined reference deviation range.

2. The actuator of claim 1, wherein the driving apparatus is further configured to apply a driving signal comprising a direct current (DC) signal form to the driving coil in the linear driving scheme.

3. The actuator of claim 1, wherein the driving apparatus is further configured to apply a driving signal comprising a PWM signal form to the driving coil in the PWM driving scheme.

4. The actuator of claim 1, wherein the driving apparatus is further configured to move the lens barrel in the direction perpendicular to the optical axis direction to perform optical image stabilization (OIS).

5. The actuator of claim 1, wherein the driving apparatus comprises a driving circuit connected to the driving coil and configured to apply a driving signal to the driving coil, and generate a control signal to the driving coil.

6. The actuator of claim 5, wherein the driving apparatus is further configured to generate the control signal having a direct current (DC) signal form in the linear driving scheme, and generate the control signal having a PWM signal form in the PWM driving scheme.

7. The actuator of claim 6, wherein the driving apparatus is further configured to compare a level of a control signal in a previous scheme with a level of a control signal in a subsequent scheme in response to a driving scheme of the driving coil being changed by the external illumination information.

8. The actuator of claim 1, wherein driving scheme determining processor is further configured to change the driving scheme to the subsequent scheme in response to the deviation between the level of the control signal in the previous scheme and the level of the control signal in the subsequent scheme being within the predetermined reference deviation range.

9. A driving apparatus of a camera module configured to drive a driving coil facing a magnetic body disposed on one side surface of a lens barrel to move the lens barrel in a direction perpendicular to an optical axis direction, the driving apparatus comprising:
a comparator comparing a present position with a target position of the lens barrel to calculate an error value;
a driving scheme determining processor configured to determine a driving scheme of the driving coil is a pulse width modulation (PWM) driving scheme in response to a level of external illumination being higher than a level of reference illumination and is a linear driving scheme in response to the level of external illumination being lower than the level of reference illumination;
a controller configured to generate a control signal based on a level determined depending on the error value and a form determined based on the driving scheme; and
a driver circuit configured to provide a driving signal to the driving coil based on the control signal,
wherein an image processor is configured to perform image processing on an image signal input by an image sensor to determine the level of external illumination, and
wherein the driving scheme determining processor is configured to maintain the previous scheme in response to a deviation between the level of the control signal in the previous scheme and the level of the control signal in the subsequent scheme being outside of a predetermined reference deviation range.

10. The driving apparatus of a camera module of claim 9, wherein the controller is further configured to generate the control signal having a direct current (DC) signal form in the linear driving scheme.

11. The driving apparatus of claim 9, wherein the controller is further configured to generate the control signal having a PWM signal form in the PWM driving scheme.

12. The driving apparatus of claim 9, wherein the driving scheme determining processor is further configured to compare a level of a control signal in a previous scheme with a level of a control signal in a subsequent scheme in response to the driving scheme of the driving coil being changed by the external illumination information.

13. The driving apparatus of claim 12, wherein the driving scheme determining processor is further configured to change the driving scheme to the subsequent scheme in response to the deviation between the level of the control signal in the previous scheme and the level of the control signal in the subsequent scheme being within the predetermined reference deviation range.

* * * * *